Oct. 18, 1966  J. W. CHANNELL ETAL  3,280,247
SPLICE ENCLOSURE FOR CABLES
Filed March 29, 1963   4 Sheets-Sheet 1
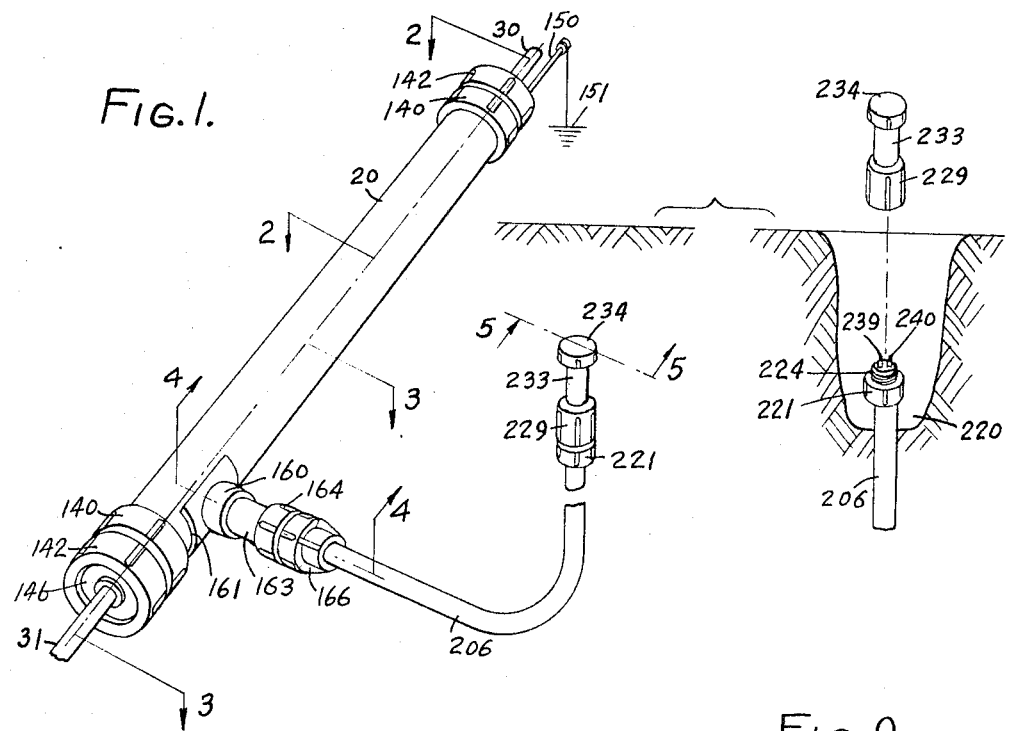
Fig. 1.
Fig. 9.
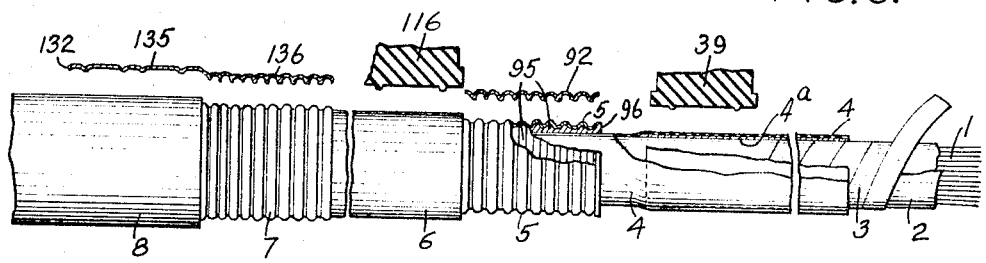
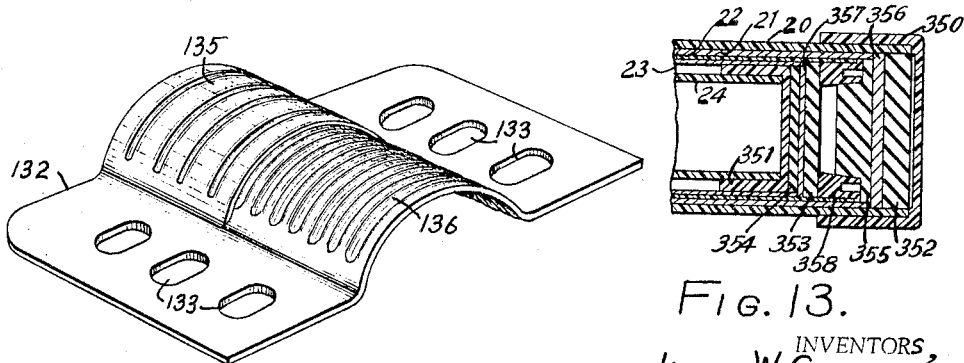
Fig. 10.
Fig. 13.
INVENTORS,
JAMES W. CHANNELL,
BY WILLIAM H. CHANNELL;
ATTORNEY

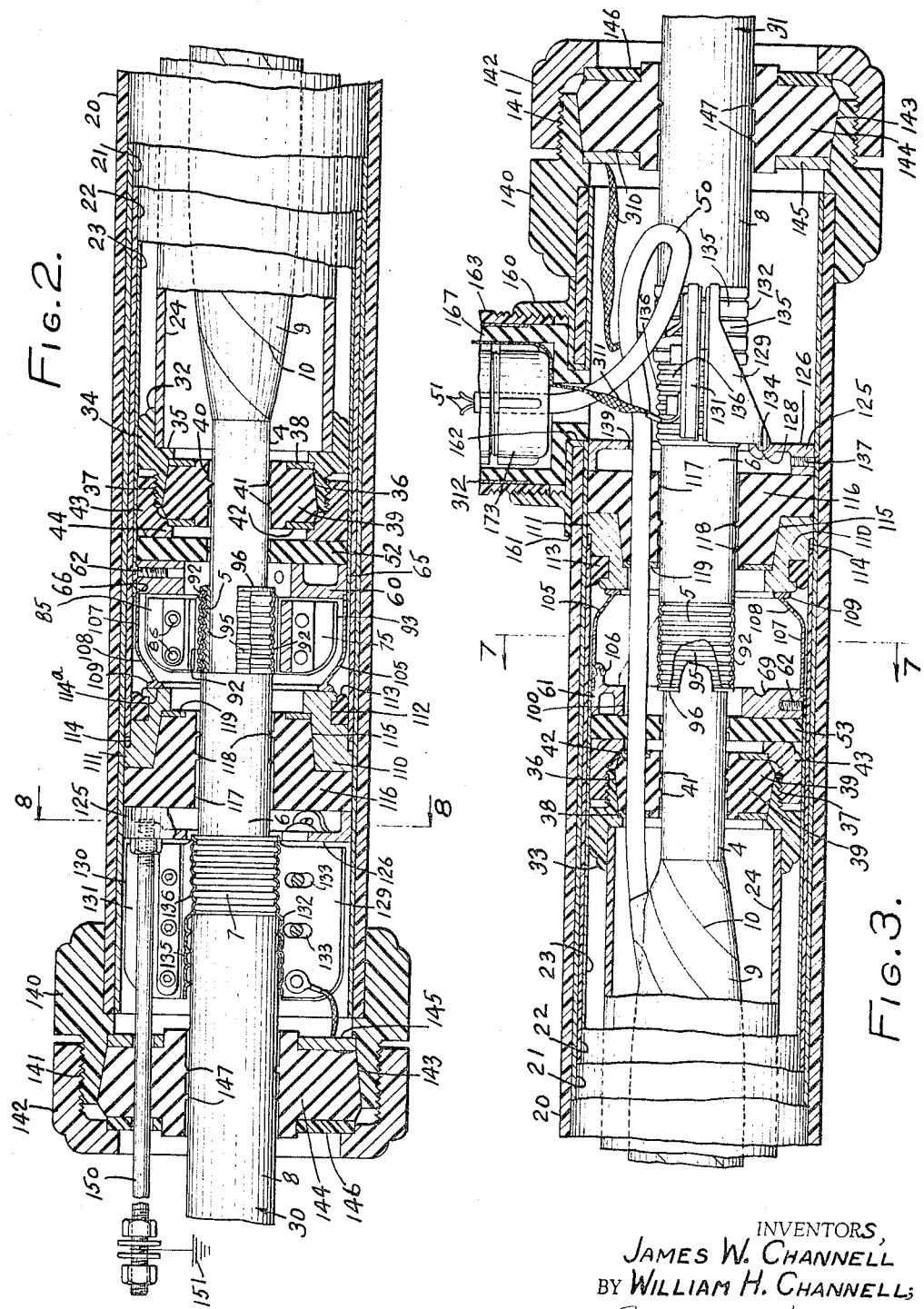

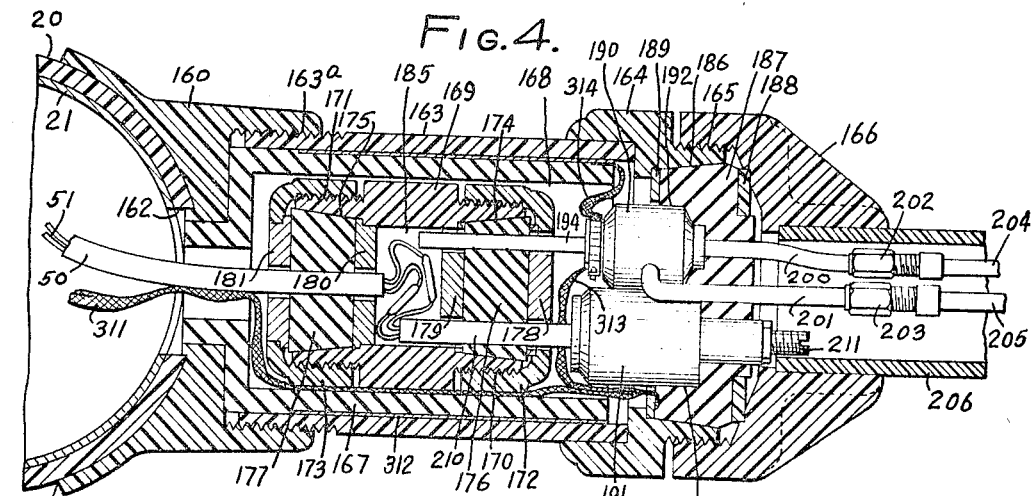
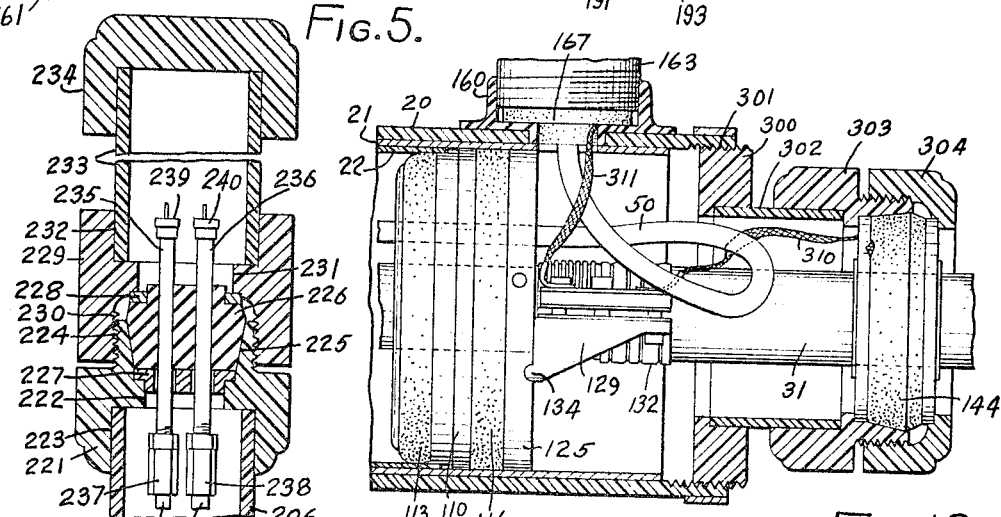

Oct. 18, 1966    J. W. CHANNELL ETAL    3,280,247
SPLICE ENCLOSURE FOR CABLES
Filed March 29, 1963    4 Sheets-Sheet 4
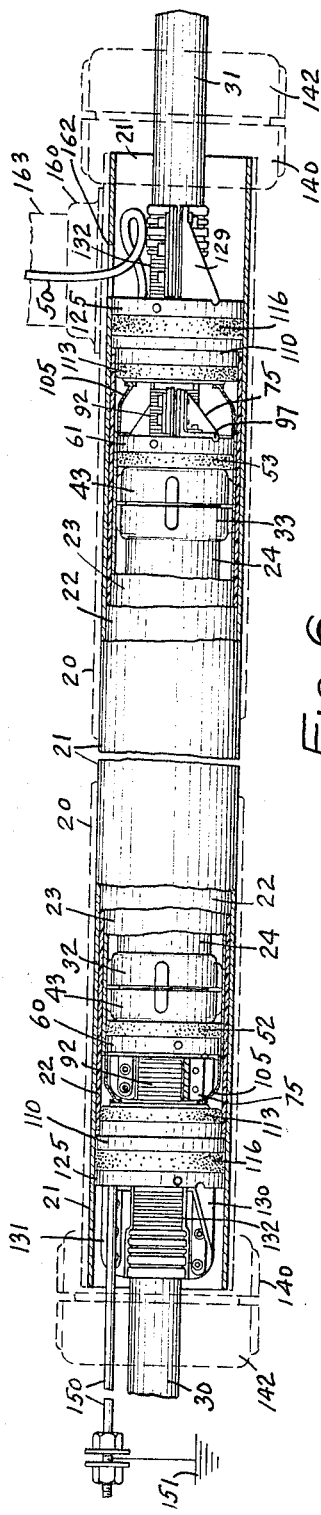
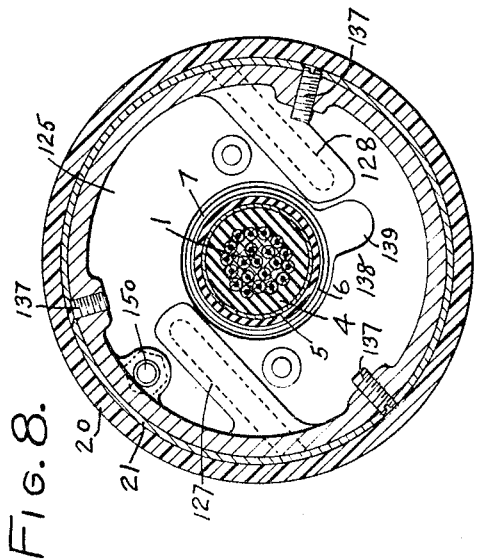
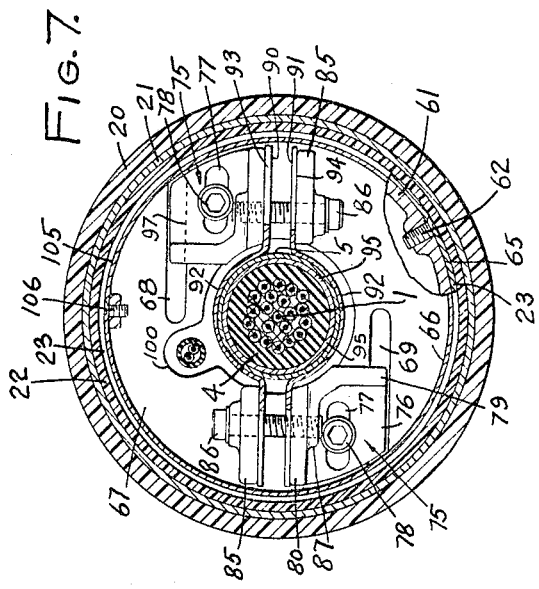
INVENTORS,
JAMES W. CHANNELL
BY WILLIAM H. CHANNELL;
ATTORNEY United States Patent Office 3,280,247
Patented Oct. 18, 1966

3,280,247
SPLICE ENCLOSURE FOR CABLES
James W. Channell, P.O. Box 117, Dana Point, Calif., and William H. Channell, 122 Oak Tree Drive, Glendora, Calif.
Filed Mar. 29, 1963, Ser. No. 269,056
14 Claims. (Cl. 174—93)

The present invention contemplates an improvement upon our Splice Enclosure for Cables, Serial No. 132,954, filed August 21, 1961, now Patent No. 3,209,067.

The present invention incorporates many novel features of construction to render a cable splice substantially free of destructive forces which would disrupt the wires of the splice. Particularly we have in mind shock resulting from explosives which might impose a tension or a compressive force sufficient to sever wires of the splice.

An object of the invention is the provision of a splice enclosure for cables which is so constructed and arranged as to eliminate breakage of the cable splice if subjected to either a compressive or a tensile stress.

A further object is to provide a splice enclosure which resists and absorbs any tensile or compressive stress imposed upon the cable splice.

A further object is the provision of a splice enclosure incorporating an inner casing for the splice, and an outer casing so arranged that relative movement therebetween does not occur.

A further object is the provision of improved pressurizing means for determining pressure leak in the splice and its enclosure.

With respect to the foregoing object, the splice is within a casing, termed hereinafter the inner casing which is pressurized. This pressure can be measured and any decrease of pressure in the splice beyond a determined amount would show a pressure leak.

Ordinarily, for missile work, cables are laid at a certain depth beneath ground surface. Usually a selected length of cable is utilized and further lengths are joined by splices. In order to be able to test any splice for leak we have provided a means which may be contacted from ground level for determining pressure in the splice and the present invention is so constructed that greater accuracy is afforded in determining any loss of pressure.

A further object is to provide a pressure determining means which is resistant to shock and not damaged by being struck or run over by heavy objects.

A further object is the provision of improved means for holding cable lengths on either side of a splice and which means effectively resists torque between the cables and the splice.

A further object is the provision of a splice enclosure so constructed and arranged that a given size of splice enclosure will accommodate different cable sizes and cable branches.

Other objects of the invention will appear in the detailed description of the invention.

In the drawings:

FIGURE 1 is a perspective view of the splice enclosure with means for testing pressure within the enclosure at the splice;

FIGURE 2 is a fragmentary, longitudinal sectional view, on an enlarged scale, and taken on the line 2—2 of FIGURE 1;

FIGURE 3 is a fragmentary, longitudinal sectional view on the line 3—3 of FIGURE 1, and on an enlarged scale;

FIGURE 4 is a fragmentary, sectional view on an enlarged scale, and taken on the line 4—4 of FIGURE 1;

FIGURE 5 is a fragmentary, sectional view on an enlarged scale, taken on the line 5—5 of FIGURE 1;

FIGURE 6 is a fragmentary, partially sectional view of the splice enclosure;

FIGURE 7 is a transverse sectional view on the line 7—7 of FIGURE 3, and on an enlarged scale;

FIGURE 8 is a transverse sectional view on the line 8—8 of FIGURE 2, and on an enlarged scale;

FIGURE 9 is a fragmentary, longitudinal, and partly sectional view of a cable showing its general construction with certain elements of the cable splice enclosure shown in section, positioned above the cable;

FIGURE 10 is a perspective view of a cable clamp used in the practice of the invention;

FIGURE 11 is a fragmentary, longitudinal sectional view of a pressure determining means for the splice enclosure;

FIGURE 12 is a fragmentary, partially sectional view of a modified splice enclosure construction; and, FIGURE 13 is a fragmentary sectional view of a load coil case assembly.

In missile installations, it is customary to have the missile at one location to be triggered from a distant point utilizing a cable between the two points. These cables are of different lengths and connected by means of a splice positioned within a splice enclosure. Where an underground duct is utilized, the cable splices are usually four to five hundred feet apart while in buried runs within the ground the splices may be fifteen hundred to three thousand feet apart. Cable construction may vary, and referring to FIGURE 9, a cable is shown in which the wires 1 form the core of the cable, 2 is a sheath wrapped around the wires of the cable, while 3 is a tape which is wrapped around the sheath 2. 4 is a plastic sheath applied over the tape and 4a is a stiff sleeve of insulation material interposed between tape 3 and sheath 4, followed by a corrugated steel sheath 5. A plastic sheath 6 overlies the corrugated sheath 5 and a bronze corrugated sheath 7 overlies the plastic sheath 6. The outer sheath 8 is plastic. We realize that cables may vary as to insulation sheaths and metallic sheaths for protecting the wires of the cable against breakage. However, we contemplate describing our invention with the type of cable shown in FIGURE 9 by way of illustration. It will be noted from FIGURE 9 that the cable is built up from sheaths of metal and plastic which alternate. Such a construction gives maximum protection to the cable, particularly for missile use. Where cable wires are interconnected, what is known as a splice results, as shown in FIGURES 2 and 3 at 9, the wires of the splice being covered by plastic tape 10. As the wires are encased within the splice enclosure of the present invention, the splice is adequately protected against shock incident to explosions and other destructive forces encountered during a war.

Obviously, reliability of the splice enclosure is a prime essential. The splice enclosure of our invention is adapted to protect the cable splice against breakage and corrosion which might result from any leakage of the splice enclosure to water or other liquids, as well as protecting the splice from heavy objects such as tanks rolling on the ground over the splice.

The splice case enclosure is made up of an outer plastic casing and a series of steel liners alternating with plastic liners. Basically, the case enclosure requires two steel and two plastic liners. Thus, referring to FIGURES 2 and 3, the splice case includes an outer casing 20 of insulation material which may be a plastic, a liner 21 of steel, a plastic liner 22 within the steel liner 21 and a steel liner 23 within the plastic liner 22. Certain of these liners are of different lengths. Thus it will be seen that the assembly of the splice case includes plastic or insulating members with intermediate steel liners in the built up structure to give maximum strength to the assembly. The splice 9 is encased within an inner plastic casing 24 and the periphery of the casing 24 is spaced from the steel liner 23. Thus, shock against the laminated assembly 20 to 23 inclusive, is not directly communicated to the casing 24. The plastic liner 22 is relatively thin and acts to prevent electrical flashing between the steel liners 21 and 23.

The present invention will be considered with relationship to the elements utilized in the construction of the complete splice enclosure and its assembly.

Referring to FIGURES 2 and 3, the outer casing 20 with its liners 21, 22, and 23 telescoped therein is first moved on one end of the cable, or one cable length, as for instance, length 30, while the casing 24 is positioned on the opposite length of cable 31. The splice casing 20 and included liners is usually quite long and if all of the liners are separated and placed end to end, a long length of cable would be included, perhaps as much as twenty or twenty-five feet. It is for this reason that the casing 20 and its liners are held in an assembled position. The liners fit with close tolerance within each other and the outer casing 20 but the tolerance is not so close as to prevent relative movement between the liners and the casing. It is realized that in manufacturing it is difficult to fabricate a casing or liner that is perfectly circular and, consequently, a test is utilized in the present instance in which the outer casing 20 is placed in a vertical position, after which the liners are separately placed therein, the liners telescoping by gravity.

After the splice 9 has been formed between the wires for the two lengths 30 and 31 of cable and the splice wrapped, as shown at 10, the splice casing 24 is moved over the splice. Casing 24 is of a length greater than the length of the splice 9, and threaded plastic adapters 32 and 33 are cemented to ends of casing 24. The adapters 32 and 33 are of like construction and the adapter 32 will be described. This adapter has a diameter which permits a portion 34 to fit with a close tolerance but one which permits the adapter to move within the liner 23. The part 34 is socketed as shown at 35 to receive an end of the casing 24. A portion beyond the socket 35 is provided with an outwardly divergent bore or seat 36 and externally this portion is provided with a reduced diameter end which is externally screw threaded at 37. The bore or seat 36 is adapted to receive a washer 38 and a tapered wall grommet 39. The grommet has a central bore 40 within which are annular protuberances or O-rings 41 which engage the periphery of the cable, specifically sheath 4. This sheath is backed by sleeve 4a whereby the grommet can be compressed to make an air tight seal. An annular cap 43 is provided with internal screw threads for engagement with the threads 37 of the adapter. The cap is so formed as to have a flanged end 44 which confines washer 42 and holds the same in engagement with the grommet. As stated, the opposite end of the casing is provided with a similar adapter and cap.

After each cap is tightened to its respective adapter, the splice and the interior of the casing 24 is tested for air leak. To accomplish this, it will be seen in FIGURE 3 that a tube 50 has one end received within the splice 9. The tube 50 is passed through a bore in the grommet 39 for the end 33. This tube, likewise, confines a pair of electric wires 51 and it is within said tube that pressure air is directed within the splice and, likewise, within the casing 24 which confines the splice. An ordinary air valve such as generally employed for automobile tires may be secured to the tube 50 for the purpose of a test. If pressure is not maintained within the splice casing and the splice, further procedure in the assemblage of the splice case is suspended until the fault is corrected. This may be an improper sealing between the case 24 and an adapter, or a grommet may be leaking air around the cable. It is particularly to be noted that when the cap is screwed upon an adapter that the grommet is compressed due to the presence of the washers 38 and 42 which preferably are of metal. It is intended that the O-ring portions 41 should have tight engagement with the periphery of the cable and particularly the plastic sheath 4. Assuming that the interior of the casing 24 and of the splice is air tight and maintains its pressure, insulation rings 52 and 53 are positioned around the cable in engagement with the caps 43. The liner 23 is then moved outwardly from casing 20 and its liners so as to overlie the casing 24 and the adapters and caps heretofore referred to as 32 and 33. This liner has a greater length than the casing 24 and its associated adapters and caps so as to extend beyond the insulation washers 52 and 53. Thereafter annular end plates 60 and 61 are moved along each cable length 30 and 31 and fastened to the liner 23 by screws or other means 62 at spaced points. The end plates closely abut the insulation washers 52 and 53 so that no play of the splice 9, the casing 24, encasing the splice and the adapters and associated caps occurs within the liner 23.

The end plate 60 will be desribed, the end plate 61 being of like construction, reference being made to FIGURES 2, 3, and 7. End plate 60 is annular in form so as to permit cable passage therethrough. The peripheral surface or rim of the end plate has two portions 65 and 66 of different diameter. The center portion 67 is provided with a pair of grooves 68 and 69 which are parallel and on opposite sides of the central hole in said plate and are chords of the plate. Central portion 67 is formed to carry adjustable brackets, which brackets in turn support cable clamps. Two pairs of brackets and clamps are used and one of said pairs will be described, the other bracket and clamp being of the same construction. Referring to FIGURES 2 and 7, bracket 75 includes an end wall 76 provided with elongated slots 77. The end wall has a flat surface which engages the flat surface 67 of the end plate. A socket headed bolt 78 is passed through the slot 77 into engagement with a screw threaded bore in portion 67 of the end plate. A washer is interposed between the socket head of the bolt and the bracket end wall. The bracket includes two right angularly related walls 79 and 80 extending from one side of the end wall. The wall 80 is provided with a cooperating backing plate 85 with suitable socket headed bolts 86 passed between the backing plate 85 and the wall 80. In this respect, the wall 80 is provided with a boss 87 to strengthen the wall 80 when the socket headed bolt is turned to bind any object interposed between the wall 80 and the backing plate 85. In this respect, a pair of opposed clamps 90 and 91 extend between the brackets. Each clamp has a corrugated curved center portion 92 and a pair of end wings 93 and 94. The opposed wings of the respective clamps are bored to permit passage therethrough of the socket headed bolts 86, as shown. The corrugated sheath 5 for the cable is backed or reinforced by a corrugated surfaced bushing 95 which is interposed between sheaths 4 and 5. The bushing 95 has a smooth bore and an end flange 96 facing the inner end plate. The corrugated centers 92 of the clamps 90 and 91 overlie and engage the bushing reinforced portion of sheath 5. The bushing flange aids in preventing movement of the cable as the flange may engage the inner end plate. The end wall of the bracket is provided with an ear or protuberance 97 which is received within the grooves 68 and 69 for guiding movement of the bracket when the bracket is moved inwardly or outwardly from the cable upon releasing the socket headed screw 78. See FIGURE 7. The portion 67 of the end plate is provided with a radial slot 100 to accommodate passage of the tube 50 therethrough. It is to be observed that the cable bushing clamp 95 surrounds the cable as shown in FIGURE 9 at 5.

A metal cup 105 open at both ends surrounds the brackets, backing plates, and clamps. This metal cup is secured to the portion 66 of the end plate by screws or other means 106. The construction of the cup is such as to provide an annular wall of uniform diameter 107 and a convergent annular wall 108 which terminates in an end flange 109. The flange portion extends beyond the corrugated clamp portion, or more specifically, the cable bushing 95, as shown in FIGURES 2 and 3. This cup functions as a stress register and is adapted to resist compressive stresses which might otherwise be imposed upon the splice. The cup is fabricated so as to withstand a determined compressive stress and as previously stated, each end of the splice is provided with a stress resister cup. At this time, the liner 22 which is of plastic is telescoped over the metal liner 23 so as to enclose the liner 23 and the parts which have already been assembled in the liner 23. As noted in FIGURES 2 and 3, the liner 22 is of greater length than the liner 23.

An adapter 110 of annular form is moved along a cable length, there being a like adapter for the opposite cable length and this adapter has a diametric portion 111 sufficient to give it a close tolerance fit within the steel liner 21. The adapter is reduced in diameter and provided with an annular groove at 112 to receive a gasket 113 which gasket bears against the liner 22. The portion 111 is reduced in diameter at 114 to accommodate an end of liner 22. As shown, the adapter has a plane end face 114a adapted to abut the flange 109 of the stress resisting cup. However, it is to be observed that the cup flange is not connected to the adapter. The adapter 110 is provided with a tapered socket 115 for reception of a washer 116 formed of rubber or other material. The washer is centrally bored at 117, the interior of the bore being provided with O-ring portions 118 so as to have fluid tight engagement of the cable sheath. The washer has a tapered wall which fits within the socket 115, the end of the washer engaging a flat ring 119 shouldered within the adapter, a portion of the washer 116 outward from the socket portion having a uniform diameter so as to fit, as stated, with close tolerance within the liner 21. As shown in FIGURE 9, the O-rings 118 engage the plastic portion of the cable, as shown at 6.

Further grouping of elements then takes place by sliding along the cable from each end, end plates 125. End plates 125 are quite similar to the end plates previously described as 60 and 61, in that the end plates are of annular form and provided with a front face 126 having chordal grooves 127 and 128. Adjustable brackets 129 and 130 extend from the face 126 and are provided with backing plates designated generally as 131, see FIGURE 3, between which brackets and the backing plates in each instance, are cable clamps of the form shown in FIGURE 10 and designated as 132. The clamps are in pairs and adjustable by means of socket headed screws passed between the brackets and the backing plates and through elongated slots 133. The brackets are of greater length than the brackets shown in FIGURE 7 as the cable clamp in each instance is larger. Each bracket is formed with an ear or protuberance 134 which fits within a groove such as 127 and 128, see FIGURE 3.

The cable clamps of the type shown in FIGURE 10 have two curved different radius corrugated portions 135 and 136 and wherein the corrugations 136 are closer together than those at 135. The curved corrugated portions are provided with end wings. As shown in FIGURE 9, the corrugations 136 engage the corrugated sheath 7 of the cable while the corrugations 135 engage the outer plastic sheath 8 of the cable. Quite obviously when the socket headed screws are tightened, the cable clamps are held at tight engagement with the cable. At this time, the plastic casing 20 with its steel liner 21 is moved so as to telescope the inner liners and, likewise, cover the cable clamps 132, as shown for both ends in FIGURES 2 and 3. The end plates 125 are secured to the steel liner 21, as shown at 137. As shown in FIGURE 3, the end plates 125 are secured to the liner 21 at a plurality of points by means of screws, as shown at 137. The end plate 125 at 138 has a radial slot 139 to permit passage therethrough of the tube 50. This tube terminates in what is generally termed a pressure pot which will be hereinafter described, and which pressure pot is detailed in FIGURE 4. Finally, each end of the plastic casing 20 has cemented thereto and externally thereof an adapter 140 having a reduced diameter externally threaded portion 141 which receives an internally threaded annular cap 142. The adapter has an outwardly extending tapered socket 143 which houses a grommet 144 interposed between a metal washer 145 and a plastic washer 146. The grommet has spaced internal O-ring portions 147 for engagement with the cable sheath, being the portion 8 in FIGURE 9. It is to be particularly noted that the external diameter of the liner 21 and the diameter of the bore of the adapter 140 is such as to allow movement of liner 21 outwardly of the adapter. In the arrangement shown of the various parts it becomes evident that when the caps are tightly secured to the adapters, that all parts within the casing 20 and its several liners are held against movement lengthwise of the casing 20. It is also evident that compressive stresses against ends of the casing 20 and its associated liners, do not in any way tend to affect the cable and particularly the splice. Stress is effectively resisted by providing different length liners which abut the adapters and end plates whereby shifting movement of the casing 24 containing the splice does not occur as the stress resisting cups will collapse before the splice is affected. This, therefore, assures that under normal conditions, or under abnormal conditions such as are encountered during wartimes, that air pressure within the splice and the casing 24 will be maintained and that air leaks are infrequent.

In testing the cables, it is customary in some installations, when a leak occurs, to direct air from a compressor through the cable and in so doing moisture is prevented from entering the cable to cause corrosion or other deleterious effect.

As shown in FIGURE 2, the end plate 125 may have a rod 150 secured thereto and extended through bores in both the grommet 144 and the washers and outwardly of the cap. This rod is grounded, as shown at 151.

Means is provided for determining any pressure leak within the splice and the splice casing and reference is made to FIGURES 4 and 5. The casing 20 is provided adjacent one end and externally thereof with a coupling 160. The base of the coupling is enlarged so as to overlie a portion of the casing 20 and is cemented or otherwise secured to the casing, see FIGURE 1 at 161. The coupling communicates with the interior of the casing at 162 and a pipe type housing 163 is threaded to the coupling 160 at 163a, the housing, in turn, at its upper end having secured thereto an adapter 164 which has a reduced diameter externally screw threaded portion 165 to secure a cap 166. The pipe type housing 163 is lined with cushioning material 167, such as neoprene, and this material extends to the casing 20 through the bore 162.

The liner 167 encases within the same at 168 an adapter 169 of annular form and which has reduced diameter externally threaded ends 170 and 171. The reduced diameter ends are adapted to receive internally threaded caps 172 and 173. The adapter ends are provided with tapered bores 174 and 175 to receive correspondingly tapered walled grommets 176 and 177. Washers are positioned on both ends of the grommets at 178, 179, 180 and 181. The arrangement is such that the washers are seated and held by shoulder portions both on the washers and in the adapter as well as for the caps so that when the caps are screwed to ends 170 and 171, the grommets are compressed within the tapered seats formed by the tapered bores to provide an airtight fit. This construction provides a small pressure cell or chamber at 185. The flexible tube 50 with wires 51 therein is passed through the central bores of the washers 180 and 181 and through a central bore of the grommet 177 within the cell 185.

The adapter 164 is provided with a tapered bore 186 forming a seat for a correspondingly tapered grommet 187 interposed between top and bottom washers 188 and 189 which washers aid in compressing the grommet when the cap 166 is tightened upon the threads 165. A valve 190 and what is termed a contactor 191, is positioned above cap 172 and in part encased in the grommet 187, as shown at 192 and 193. The contactor 191 is of the type which remains open when there is a given air pressure in the cell 185 and closes when there is a pressure drop in the cell. A tube 194 depends from the valve 190 and is passed through cap 172, a bore in the grommet 176 and through a bore in the washer 178, the open end of the tube being received within the pressure cell 185. A pair of tubes 200 and 201 have communication with the valve 190, the tubes 200 and 201 being passed through bores provided in the grommet 187. Tubes 200 and 201 are connected by unions 202, 203, to further tubes 204 and 205. The tubes 200, 201, 204, 205, together with the unions 202, 203 are within a large diameter, flexible tube 206 one end of which is received within the cap 166 while the opposite end 206 connects with the device shown in FIGURE 5, to be described.

The contactor 191 (FIG. 4) connects with the wires 51 by means of leads passed through a tube 210. This tube is passed through openings in the washers 178 and 179, the grommet 176 and a bore in the right hand cap 172. The contactor is a type of switch which closes when pressure within the splice and the splice casing decreases below a determined amount. The wires within tube 50 are connected to wires within the cable so that an alarm is actuated at a central station to give an indication that pressure has decreased within the splice and the splice casing indicative of an air leak. The contactor is adjustable as to opening or closing by screw means 211. Neither the valve 190 or the contactor 191 is detailed as such devices are standard on the market.

For testing air pressure within the cell 185 at a point remote from the splice casing, the means of FIGURE 5 is provided. Usually the splice casing is situated in a trench or buried beneath the ground surface for a depth of possibly three or more feet and, accordingly, in order to make proper pressure tests to determin if the splice casing is defective in any particular, it is convenient to have a means adjacent the ground surface for this purpose. Thus, in FIGURE 1 a shallow well is shown at 220. This well 220 may be filled with loose dirt and marked or left open for convenience to expose the testing means shown in FIGURE 5. This means includes an adapter 221 of annular form and having two bores of different diameter 222 and 223 the larger diameter bore 223 receiving the outer end of the flexible tube 206. The adapter 221 (FIG. 3) has a reduced diameter externally threaded portion 224 and a tapered socket 225 for seating a grommet 226 having a tapered outer surface. A washer 227 is seated within the cap below the tapered socket and a further washer 228 is in opposed position to washer 227 so as to engage both ends of the grommet. An adapter 229 of annular form is internally threaded at 230 for engagement with the threaded end 224 of the adapter 221. The adapter 229 (FIG. 5) is provided with a reduced diameter central bore 231 and an enlarged central bore 232 which accommodates a pipe spacer 233 of approximately the same diameter as the tubing 206. A cap 234 closes the outer end of the pipe spacer 233. A pair of tubes 235 and 236 extend transversely through the grommet 226 and by means of connectors 237 and 238 joins the tubes 204 and 205. Ends of the tubes 235 and 236 carry valves 239 and 240. These valves are of the type used for pneumatic tires.

As shown in FIGURE 11, ofttimes it is unnecessary to provide the equipment shown in FIGURES 4 and 5, depending upon use of the invention. However, pressure must be maintained within the splice casing 24 and this is accomplished by providing elongated tube 241 which has one end opening within the casing 24 while the opposite end carries an air valve 242.

In FIGURE 12 we have illustrated an adaptation of our invention wherein a single size of splice enclosure may be utilized with end reducers. It may be desired to have multiple cable connections with the splice which would require a large splice casing. If there are no multiple branches from the splice, the casing may be of smaller dimension. Assuming that it is desired to use more or less a standard side of splice enclosure with a splice enclosure which might accommodate several branches, the same adapter and cap as shown in FIGURE 11 is utilized in FIGURE 12. The outer casing 20 in FIGURE 12 is of greater diameter than the casing 20 in FIGURE 11. In the case of FIGURE 12, an annulus 300 is externally threaded for engagement with internal threads 301 of casing 20. The annulus 300 is formed to carry a pipe spacer 302 extending outwardly from the annulus and the pipe spacer, in turn, supports the adapter 303 corresponding to adapter 140 of FIGURE 3 and cap 142, the cap being indicated as 304. The grommet and washers remain the same as for FIGURE 3.

Certain metal parts of the splice enclosure are bonded together by means of metal tapes, as shown for instance in FIGURE 3 at 310, and in FIGURES 4 and 12 at 311. It is to be observed in FIGURE 4 that a metal sleeve is interposed between the cushioning liner 167 and the housing 163 at 312 and that the washer 189 is grounded by metal tape at 313 to the valve 190, the valve in turn being grounded by tape 314 to cylinder 312.

In certain aspects of our invention, it is desirable to provide what is known as a load coil case assembly for the purpose of increasing the inductance of a line. Generally, a number of lines of the cable are provided with inductance coils such as the well-known Pupin coils at certain points along the lines. This is called lump loading. However, for the purpose of increasing the loading, it is essential that the lines of the cable be properly protected in much the same manner as our cable splice enclosure protects the cable splice. To accomplish this, we may provide the splice enclosure end shown in FIGURE 2 and not use the end portion of such splice enclosure shown in FIGURE 3. We mean by this that the outer casing 20, the alternate steel and plastic liners 21 to 23 inclusive are included as well as the inner plastic casing 24, as well as the remaining portions; to wit, all elements and parts shown in FIGURE 2 save the cable splice. The lines which are to be loaded are brought in cable form either by means of a branch from the main cable or the main cable is brought into the load coil case with certain lines connected to loading coils which are positioned within the inner casing 24. In place of the elements shown in FIGURE 3 for the opposite end of the splice case as shown, we provide the construction shown in FIGURE 13 wherein the outermost casing 20 receives an insulation end cap 350 and the casing 24 likewise is capped as shown at 351. Cap 351 spaces the casing 24 from the liners 21, 22, and 23. Between the ends of the caps 350 and 351 are positioned insulation disks 352, 353, and 354 and a grommet 355. Metal washers are disposed between the insulation disks and grommet as shown at 356 and 357. A sleeve assembly member 358 is interposed between the grommet 355 and disk 353. In this manner and by the arrangement shown, a load coil assembly within the casing 24 is protected against the admission of water or air leak if the interior of the casing 24 is pressurized.

The operation, uses, and advantages of the invention just described, are as follows.

It will be observed from FIGURES 2 and 3 that only the outer end plates 125, metal brackets and clamps connected thereto, including liner 21, are grounded. The inner end plates 60 and 61 with brackets 80, clamps 90 and 91, cups 105, and liner 23, are not grounded. Thus, the inner and outer end plates and associated metal elements are maintained electrically separated. This arrangement is important as it shields the elements from electrical surge potential.

We have previously outlined in detail the assembly of the outer casing with its plastic and steel liners and have pointed out that all of the steel liners are within the outer plastic casing 20. The splice 9 is made first and completed after which the splice casing 24 is positioned so as to completely surround the splice, and, likewise, be spaced from the inner wall thereof, as shown in FIGURES 2 and 3. Afterwards the parts are assembled relative to each cable length and the steel liners sequentially brought into position and secured to the parts such as the innermost liner at 23 being secured to the inner end plates 60 and 61. The assembly then continues with the outermost end plates 125 joined to the outermost metal liner; that is, the metal liner adjacent the plastic casing 20. Assembly of all parts is simple and may be carried out expeditiously. The construction is such that the splice is protected so as to be substantially leak proof within the casing 24 and to hold the pressure even though the splice enclosure is subjected to rough usage.

It is essential where cables are used for missile work and the cable is spliced at certain distances, that the splice enclosure adequately protect the cable and the splice. This has been accomplished by utilizing steel liners, and the steel liners together with the stress resisters; to wit, the metal cups at 105, withstand compressive stresses up to a selected p.s.i. If the cable splice is subjected to excessive compressive stress, one or the other of the cups will collapse but still prevent major damage to the splice or to the cable. It is to be particularly noticed that there is no end play between the casings when assembled and particularly the casing 24 while free within the outermost casing 20 and its assembled liners has no relative movement. This because of the assembly of the end plates, both outer and inner, and the several grommets which surround the cables and by means of adapters and caps which engage the steel liners. Also, the stabilizer brackets which carry the cable clamps tend to resist both tensile and compressive stresses axially on the cable. This arrangement is well illustrated in FIGURE 9 for the several parts of the assembly and engagement with the cable.

One of the chief difficulties encountered by so-called pressure pots has been the fact that the pressure pot loses air. While we claim no particular invention in a pressure pot, we have improved existing pressure pots by providing the small pressure cell 185. The capacity of this cell is very small. The usual pressure pot has a large chamber within which are the valve and contactor. In such an arrangement the compartment is under pressure but air may leak past the threads to the outside and it has generally been found to be unsatisfactory. There is substantially no leak possible in the construction depicted in FIGURE 4, as we do not depend on any threads. In fact, the tubes 194 and 210 are closely engaged by the grommet 176 and the tube 50 has airtight engagement with the grommet 177. Air passage is, therefore, through the tube 50 into the pressure cell 185 and through the tubes 194 and 210 directly to the valve 190 and the contactor 191. Furthermore, both the valve and the contactor are outside and isolated from the pressure cell. This arrangement has proved most excellent in actual service.

A further fact of importance is the use of the flexible plastic tubing 206 which goes to the ground surface or terminates in the well 220. This tube, being flexible instead of rigid, allows heavy objects to roll over the same without damage or loss of air in the splice or cable. This is important when it is realized that such structures are often hit by post hole diggers, heavy trucks, and are subject to the effects of explosives. The flexible tube may be knocked over without damage. As there is no standard cable size, the adjustable character of the cable clamps is of importance to accommodate all size cables.

It should be pointed out at this time that the air valve 190 which has communication with the air cell 185 through tube 194, may be opened by directing pressure air through one of the tubes such as 204. Thus, air pressure applied to the valve 239 will open the valve 190 and permit air from cell 185 to pass through tube 205 to valve 240. A suitable indicating device applied to valve 240 will indicate the pressure in the air cell 185.

We claim:
1. A cable splice enclosure, including: a casing assembly comprising an outer casing formed of insulation material, and alternate liners within the insulation casing of metal and insulation material, there being a minimum of two metal liners and an intermediate insulation liner with the metal liner innermost; an inner casing of insulation material concentric within the innermost metal liner of the casing assembly; a cable splice housed within the innermost insulation casing with lengths of cable at both ends of the splice, means at both ends of the innermost insulation casing maintaining the inner insulation casing in spaced relationship to the innermost metal liner, and for maintaining the interior of the inner insulation casing airtight.

2. The device as set forth in claim 1, and means on both lengths of cable at opposite ends of the splice anchoring the cable lengths to the innermost metal liner whereby to prevent axial shifting of the innermost insulation casing relative to said innermost metal liner.

3. The device as set forth in claim 1, and further means securing the lengths of the cable to the innermost metal liner.

4. A splice enclosure for cables of the type wherein two lengths of cable are spliced together, including: an outer plastic casing and steel and plastic liners within said outer plastic casing to provide a casing assembly wherein the steel and plastic liners alternate, a cable splice housed within the enclosure with lengths of cable at both ends of the splice, an inner plastic casing surrounding the cable splice and spaced from the innermost steel liner, means at each end of the inner plastic casing for maintaining the interior of the innermost plastic casing airtight, inner annular end plates secured to the innermost steel liner and through which the cable lengths are passed, outer annular end plates spaced from the inner annular end plates, the outer annular end plates being secured to the outermost steel liner, and gasket means, in engagement with the cable lengths and with the outermost steel liner, interposed between the inner and outer annular end plates.

5. The device as set forth in claim 4 with cable clamp means secured to the inner annular end plates and the cable lengths.

6. The device of claim 4 with stress resisting means between the inner annular end plates and the gasket means, the stress resisting means being secured to the inner annular end plates and in abutting engagement with the gasket means.

7. The device of claim 5 with clamp means for cable lengths adjacent ends of the outermost plastic casing and secured to the outer annular end plates and the cable lengths.

8. The device of claim 7 with insulation means enclosing the outermost ends of the outermost plastic casing to form an air-tight seal.

9. The device of claim 7 with a plurality of relatively movable bracket means carried by the outer annular end plates securing the clamp means in engagement with the cables at larger diameter portions thereof.

10. A protective device for spliced cables comprising:
(A) an outer insulating casing,
(B) closure means at each end of the casing,
(C) three telescoping liners within the casing, these being:
   (a) an outer metal liner
   (b) an inner metal liner and
   (c) an insulating liner between the inner and outer metal liners;
(D) an inner casing of insulation material spaced from the inner metal liner of the casing assembly, (E) a cable splice housed within the inner casing with lengths of cable extending from both ends of the splice, (F) means at each end of the inner casing for holding the inner casing coaxial with and spaced from the inner metal liner (G) an end plate fastened to each end of the inner metal liner and (H) a stress resisting means located beyond each end of the splice and secured to the proximate end plate to resist stress which might otherwise be imposed upon the splice.

11. The device of claim 10 in which each stress resisting means comprises a metal cup secured to an end plate and a backing plate clamped to the proximate cable length.

12. The device of claim 11 in which the metal cup has an annular wall of uniform diameter surrounding the backing plate and the clamp, and an end portion of smaller diameter terminating in an end flange, said cup being fabricated to withstand a predetermined compressive stress.

13. The device of claim 12 in which the end plate carries a plurality of relatively adjustable brackets and the clamp is in two parts surrounding the cable length on opposite sides and has end wings connected by screw means to the brackets.

14. The device of claim 10 in which the means to hold the inner casing coaxial with the innermost metal liner includes a threaded adapter fastened to said inner casing at each end, a cap engaging said liner and threaded to said adapter, a grommet oppositely wedged by the adapter and the cap end snugly receiving one of the cable lengths, an insulating ring having an air-tight engagement with the inner metal liner and with the cable length, resting against the cap, an end plate secured to the stress resisting means and a gasketed adapter having a tapered socket, a centrally bored washer having peripheral engagement with the inner metal liner and a second end plate secured to the inner metal liner.

References Cited by the Examiner

UNITED STATES PATENTS

| | | | |
|---|---|---|---|
| 2,220,728 | 11/1940 | Piercy | 174—11 |
| 2,449,271 | 9/1948 | Bennett et al. | 174—11 |
| 2,810,800 | 10/1957 | Hasselhorn | 200—81 |
| 2,899,516 | 8/1959 | Smith | 200—81 |
| 2,943,140 | 6/1960 | Bender | 174—93 |
| 2,946,839 | 7/1960 | Horning | 174—93 |
| 3,130,259 | 4/1964 | Rischard et al. | 174—93 |

LEWIS H. MYERS, *Primary Examiner.*

JOHN P. WILDMAN, *Examiner.*

D. CLAY, R. K. SCHAEFER, S. DAVID,
*Assistant Examiners.*